Patented Dec. 12, 1950

2,533,204

UNITED STATES PATENT OFFICE 2,533,204

TERNARY INTERPOLYMERS COMPRISING ACRYLONITRILE AND N-SUBSTITUTED MALEAMIC ACIDS

John R. Caldwell, Kingsport, Tenn., assignor to Eastman Kodak Company, Rochester, N. Y., a corporation of New Jersey No Drawing. Application November 23, 1949, Serial No. 129,168

14 Claims. (Cl. 260—78.5)

This invention relates to ternary interpolymers comprising acrylonitrile and N-substituted maleamic acids. More particularly, this invention relates to ternary interpolymers comprising acrylonitrile, a N-substituted maleamic acid, and methyl acrylate or vinyl acetate, methods for making these interpolymers, and new and useful products obtained therefrom.

Acrylonitrile has been previously used in the preparation of various polymers which are generally characterized by insolubility, or very low solubility in many common organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

I have now found new ternary interpolymers comprising acrylonitrile, a N-substituted maleamic acid, and methyl acrylate or vinyl acetate which can be shaped into objects susceptible to dyeing.

It is, therefore, an object of my invention to provide new ternary interpolymers comprising acrylonitrile, a N-substituted maleamic acid, and methyl acrylate or vinyl acetate. A further object is to provide a process for preparing such polymers. Still another object is to provide shaped objects prepared from these polymers and a method for preparing these shaped objects.

According to my invention I prepare my new ternary interpolymers containing acrylonitrile, a N-substituted maleamic acid, and methyl acrylate or vinyl acetate by polymerizing in the presence of a polymerization catalyst a mixture consisting of from 45 to 85% by weight of acrylonitrile, from 5 to 30% by weight of a maleamic acid selected from those represented by the following general formula:

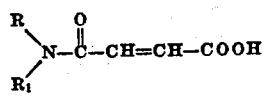

wherein R represents a member selected from the group consisting of a hydrogen atom and an alkyl group, such as methyl, ethyl, n-propyl, isopropyl, n-butyl, etc. groups (e. g. an alkyl group of the formula $C_nH_{2n+1}$ wherein $n$ represents a positive integer from 1 to 4) and $R_1$ represents a member selected from the group consisting of an alkyl group, such as methyl, ethyl, n-propyl, isopropyl, n-butyl, etc. groups (e. g. an alkyl group of the formula $C_nH_{2n+1}$ wherein $n$ represents a positive integer from 1 to 4) and a monocyclic aryl group of the benzene series (e. g. phenyl, o- or p-chlorophenyl, o- , m- or p-tolyl, etc. groups), and from 5 to 30% by weight of a vinyl compound selected from the group consisting of vinyl acetate and methyl acrylate.

Typical N-substituted maleamic acids which I can advantageously employ comprises N-methylmaleamic acid, N-ethylmaleamic acid, N-isopropylmaleamic acid, N,N-dimethylmaleamic acid, N,N-diethylmaleamic acid, N-benzylmaleamic acid, N-phenylmaleamic (maleanilic) acid, N-(o- and p-methoxy) phenylmaleamic acids, N-(o-hydroxy) phenylmaleamic acid, N,N-diphenylmaleamic acid, etc. Other N-substituted maleamic acids can advantageously be used, although the acids enumerated have been found to be especially useful. Many of these acids are well known and have been previously described in the literature. The methods for making the acids represented by the above general formula are also well known, and any of these well-known methods can be employed in the preparation of the N-substituted maleanic acids of my invention. One advantageous method for preparing N-monosubstituted maleamic acids comprises hydrolyzing the N-substituted maleimides in the presence of a hydrolysis catalyst. For example, N-isopropylmaleamic acid can be prepared by hydrolyzing N-isopropylmaleimide in the presence of a cold, concentrated calcium hydroxide solution according to the method of Giustiniani, "Gazzetta Chimica Italiana,'" vol. 22, I, p. 171. Another useful method comprises heating equimolar amounts of a monoamine and maleic anhydride in a benzene solution (ibid., vol. 26, I, p. 434). Di-substituted maleamic acids can be prepared advantageously by heating equimolar amounts of a secondary amine, e. g., diethylamine, methylpropylamine, etc., with maleic anhydride according to the method described above. (See also, for example, Anschutz, "Berichte," vol. 20, p. 3215, Hoogerwerff et al., "Rec. trav. chim.," vol. 18, p. 363.)

Useful polymerization catalysts which can advantageously be employed in my invention include the organic peroxide polymerization catalysts, such as acetyl peroxide, benzoyl peroxide, acetyl benzoyl peroxide, lauroyl peroxide, t-butyl hydroperoxide, urea peroxide, triacetone peroxide, etc.; inorganic peroxide polymerization catalysts, such as the persulfates (e. g. the alkali metal persulfates, such as sodium, potassium, etc.

persulfates, and ammonium persulfate, etc.), the perborates (e. g. alkali metal perborates, such as sodium, potassium, etc. perborates, etc.), hydrogen peroxide, etc. Potassium persulfate has been found to be an especially useful catalyst for the purposes of my invention.

The polymerization can also be carried out in the presence of actinic light, ultra-violet radiation, etc. When it is preferred to use energy of this type from external sources, peroxide polymerization catalysts can be added in small amounts, if desired.

The amount of polymerization catalyst used can be varied, depending on the particular composition being polymerized, the presence or absence of heat, etc. Generally from 0.05% to 3% by weight, based on the total weight of polymerizable materials, of catalyst can be used, although I have found that from 0.1 to 0.5% by weight of catalyst is especially useful in practicing the process of my invention.

Heat accelerates the polymerization, and temperatures varying from 20° to 100° C. have been found to be useful. A more limited temperature range which can be used is from 45° to 70° C., while especially good results have been obtained in the cases where the polymerization was carried out at a temperature of from 50° to 60° C. Lower or higher temperatures can be used, if desired.

The polymerization can be advantageously carried out by an emulsion or dispersion method in water. In some cases, it is not necessary to employ emulsifying or dispersing agents, although substances which lower the solubility of the monomeric materials used can be added to the polymerization mixture prior to, or during the polymerization. The reactants are then agitated to distribute evenly the heat liberated in the polymerization reaction. My new ternary interpolymers separate from the reaction medium as they are formed.

Suitable emulsifying agents which can be added to the reaction medium include such agents as sulfonated mineral oil, fatty alcohol sulfates, e. g., sodium lauryl sulfate, aromatic sulfonates, e. g., the alkali metal salts of aromatic sulfonates, such as sodium isobutyl naphthalene sulfonate, polyethylene glycols, polyvinyl alcohol, partially hydrolyzed polyvinyl acetate, methyl cellulose, starch, methylated starch, etc. Included within the class of emulsifying agents which can advantageously be used in my invention are certain agents, some of which are listed above, which are more generally referred to as granulating agents. These granulating agents do not cause the polymer to form in the same physical condition as that observed with the emulsifying agents, but they are useful for the purposes of my invention.

My new ternary interpolymers can be dissolved in such solvents as N,N-dimethylformamide, N,N-dimethylacetamide, γ-valerolactone, γ-butyrolactone, etc. Also useful for dissolving the new interpolymers of my invention are solvents such as, for example, those containing two parts acetonitrile and one part N,N-dimethylformamide, or two parts of acetonitrile and one part γ-valerolactone, etc.

Many of my new ternary interpolymers are especially useful in the preparation of synthetic fibers by conventional wet-spinning processes. The fibers formed have excellent strength and elasticity. Also considerable importance are the facts that my interpolymers provide fibers which can be dyed with acid-wool dyes, cellulose acetate dyes, and some vat dyes, and these fibers have a high softening point, i. e. many of the fibers melt at temperatures above 200° C.

The new ternary interpolymers of my invention are also useful in the manufacture of films, molded objects, tapes, paper sizing, adhesive compositions, etc.

The following examples illustrate the preparation of some of the more useful interpolymers which can be prepared according to my invention.

*Example 1*

60 g. of acrylonitrile, 20 g. of vinyl acetate and 20 g. of N-methylmaleamic acid were placed in a flask containing 700 g. of water. While the mixture was stirred gently, 0.3 g. of potassium persulfate and 0.2 g. of sodium bisulfite were added. Stirring of the mixture was then continued for eight hours while the temperature of the reaction was maintained at from 60 to 65° C. The interpolymer separated out as a grainy precipitate. It was filtered off, dried in an oven at 60° C. and then weighed. A 90% yield was obtained.

This polymer was found to be soluble in N,N-dimethylacetamide. It was also soluble in a mixture of two parts of acetonitrile and one part of N,N-dimethylformamide. A yarn which was spun from a solution of the polymer was oriented by drafting from 400 to 500%, and, after such a treatment, it was found to have a strength of 4 grams per denier and an elongation of 16%. After the fibers had been treated at 180° C. for two minutes, they showed a softening point above 220° C., and a hot water shrink of less than 10%. The fibers were found to be susceptible to acid-wool, cellulose acetate and vat dyes.

Operating in a manner similar to that illustrated above, a useful interpolymer can be obtained by replacing the N-methylmaleamic acid with a molecularly equivalent amount of N-n-butylmaleamic acid.

*Example 2*

20 g. of acrylonitrile, 4 g. of methyl acrylate and 6 g. of N-ethylmaleamic acid were placed in a bottle containing 100 g. of water. To the mixture 0.5 g. of sulfonated mineral oil, 0.5 g. of the sodium salt of dodecanol sulfate and 0.05 g. of potassium persulfate were added. The bottle was then tumbled end over end at 50° C. for 24 hours. The resin was coagulated with sodium sulfate, washed and dried. A yield of 25 g. of the desired interpolymer was obtained. It was found to be soluble in a mixture of two parts of acetonitrile and one part of N,N-dimethylformamide.

The yarn spun from a solution of the interpolymer obtained in the above example had a strength of 3.5 g. per denier with an 18% elongation. It could be dyed by acid-wool dyes and cellulose acetate dyes.

When a molecularly equivalent amount of N,N-diethylmaleamic acid replaces the N-ethylmaleamic acid used in the above example, a new interpolymer, which is also useful in the formation of a dye-susceptible yarn, can be obtained.

*Example 3*

66 g. of acrylonitrile, 14 g. of vinyl acetate, 20 g. of N-phenylmaleamic acid (maleanilic acid), 2 g. of sulfonated mineral oil, 2 g. dodecyl sulfate sodium salt, and 0.4 g. of potassium persulfate were placed in 200 cc. of water in a glass bottle.

The bottle was sealed and tumbled end over end at 60° C. for 20 hours. The interpolymer was coagulated with sodium sulfate, washed, and dried to give 95 g. of the desired product.

The interpolymer produced in the above example was found to be soluble in N,N-dimethylacetamide. Yarns spun from solutions of this interpolymer had high strength and elasticity, and they were also found to have a melting point above 200° C.

*Example 4*

Into a flask containing 750 cc. of water, there were placed 60 g. of acrylonitrile, 20 g. of methyl acrylate, 20 g. of N-methylmaleamic acid, 0.3 g. of potassium persulfate and 0.2 g. of sodium bisulfite. The mixture was then tumbled end over end at 50° C. for 25 hours. After filtering the reaction mixture and drying the material obtained, 80 g. of the desired interpolymer remained.

The resin obtained in the above example was found to be soluble in a mixture of acetonitrile and water, the mixture being composed of 10% water. Films coated from a viscous solution of the interpolymer were clear, tough and flexible, and were found to be susceptible to acid-wool dyes.

*Example 5*

25 g. of N-ethylmaleamic acid, 20 g. of vinyl acetate and 55 g. of acrylonitrile were suspended in one liter of water. To the mixture, 1.2 g. of potassium persulfate were added and the mixture was stirred at 55° C. to 60° C. for 12 hours. The resin which had precipitated was filtered off, washed and dried to give a yield of 89 g. of an interpolymer which was soluble in acetonitrile. Solutions of this interpolymer were found to be useful in the preparation of fibers.

*Example 6*

55 g. of acrylonitrile, 25 g. of N-isopropylmaleamic acid, 20 g. of methyl acrylate were suspended in 800 cc. of water. There were then added 1.0 g. of ammonium persulfate and 0.4 g. of sodium bisulfite to the reaction mixture. The mixture was stirred at 60° to 65° C. for 10 hours, at the end of which time the reaction mixture was filtered, the precipitate washed and dried. There were obtained 90 g. of an interpolymer which could be dissolved in N,N-dimethylacetamide.

When a molecularly equivalent amount of N-methyl, N-n-propylmaleamic acid replaces the N-isopropylmaleamic acid in the above example, an interpolymer useful in the preparation of sheets and films can be obtained.

*Example 7*

80 g. of acrylonitrile, 12 g. of N-phenylmaleamic acid and 8 g. of methyl acrylate were suspended in 1200 cc. of water. To the suspension, 1.4 g. of potassium persulfate and 1.0 g. of sodium bisulfite were added. The mixture was then stirred at 50 to 55° C. for ten hours. After filtering the reaction mixture, and washing and drying the resin obtained, a 92 g. yield of the desired interpolymer remained. This interpolymer was found to be especially useful for the preparation of fibers.

Operating in a manner similar to that illustrated above other new interpolymers comprising acrylonitrile, an N-substituted maleamic acid and methyl acrylate or vinyl acetate can be obtained. The compositions of the interpolymers obtained closely parallel that of the monomeric mixture from which they are prepared. Of course, the composition of the interpolymer can be varied by shortening the period of heating, using higher or lower temperatuers of polymerization, etc.

What I claim as my invention and desire secured by Letters Patent of the United States is:

1. A ternary interpolymer containing in the polymer molecule from 45 to 85 per cent by weight of acrylonitrile, from 5 to 30 per cent by weight of a maleamic acid selected from those represented by the following general formula:

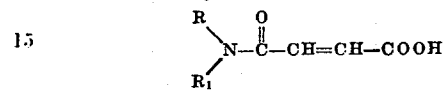

wherein R represents a member selected from the group consisting of a hydrogen atom and an alkyl group containing from 1 to 4 carbon atoms and R₁ represents a member selected from the group consisting of an alkyl group containing from 1 to 4 carbon atoms and a monocyclic aryl group of the benzene series, and from 5 to 30 per cent by weight of a vinyl compound selected from the group consisting of vinyl acetate and methyl acrylate.

2. A ternary interpolymer containing in the polymer molecule from 45 to 85 per cent by weight of acrylonitrile, from 5 to 30 per cent by weight of a maleamic acid represented by the following general formula:

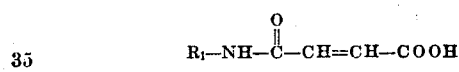

wherein R₁ represents an alkyl group containing from 1 to 4 carbon atoms, and from 5 to 30 per cent by weight of methyl acrylate.

3. A ternary interpolymer containing in the polymer molecule from 45 to 85 per cent by weight of acrylonitrile, from 5 to 30 per cent by weight of a maleamic acid represented by the following general formula:

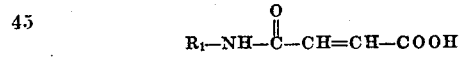

wherein R represents an alkyl group containing from 1 to 4 carbon atoms, and from 5 to 30 per cent by weight of vinyl acetate.

4. A ternary interpolymer containing in the polymer molecule from 45 to 85 per cent by weight of acrylonitrile, from 5 to 30 per cent by weight of a maleamic acid represented by the following general formula:

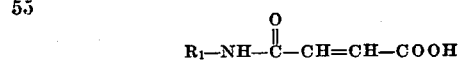

wherein R₁ represents a monocyclic aryl group of the benzene series, and from 5 to 30 per cent by weight of methyl acrylate.

5. A ternary interpolymer containing in the polymer molecule from 45 to 85 per cent by weight of acrylonitrile, from 5 to 30 per cent by weight of N-methylmaleamic acid, and from 5 to 30 per cent by weight of methyl acrylate.

6. A ternary interpolymer containing in the polymer molecule from 45 to 85 per cent by weight of acrylonitrile, from 5 to 30 per cent by weight of N-methylmaleamic acid, and from 5 to 30 per cent by weight of vinyl acetate.

7. A ternary interpolymer containing in the polymer molecule from 45 to 85 per cent by weight of acrylonitrile, from 5 to 30 per cent by weight of maleanilic acid, and from 5 to 30 per cent by weight of methyl acrylate.

8. A process for preparing a ternary interpolymer comprising polymerizing in the presence of a peroxide polymerization catalyst a mixture consisting of 45 to 85 per cent by weight of acrylonitrile, from 5 to 30 per cent by weight of a maleamic acid selected from these represented by the following general formula:

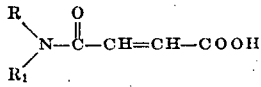

wherein R represents a member selected from the group consisting of a hydrogen atom and an alkyl group containing from 1 to 4 carbon atoms and $R_1$ represents a member selected from the group consisting of an alkyl group containing from 1 to 4 carbon atoms and a monocyclic aryl group of the benzene series, and from 5 to 30 per cent by weight of a vinyl compound selected from the group consisting of vinyl acetate and methyl acrylate.

9. A process for preparing a ternary interpolymer comprising polymerizing in the presence of a peroxide polymerization catalyst a mixture consisting of 45 to 85 per cent by weight of acrylonitrile, from 5 to 30 per cent by weight of a maleamic acid represented by the following general formula:

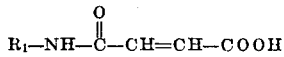

wherein $R_1$ represents an alkyl group containing from 1 to 4 carbon atoms, and from 5 to 30 per cent by weight of methyl acrylate.

10. A process for preparing a ternary interpolymer comprising polymerizing in the presence of a peroxide polymerization catalyst a mixture consisting of 45 to 85 per cent by weight of acrylonitrile, from 5 to 30 per cent by weight of a maleamic acid represented by the following general formula:

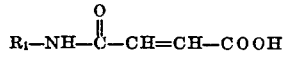

wherein $R_1$ represents an alkyl group containing from 1 to 4 carbon atoms, and from 5 to 30 per cent by weight of vinyl acetate.

11. A process for preparing a ternary interpolymer comprising polymerizing in the presence of a peroxide polymerization catalyst a mixture consisting of 45 to 85 per cent by weight of acrylonitrile, from 5 to 30 per cent by weight of a maleamic acid represented by the following general formula:

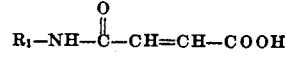

wherein $R_1$ represents a monocyclic aryl group of the benzene series, and from 5 to 30 per cent by weight of methyl acrylate.

12. A process for preparing a ternary interpolymer comprising polymerizing in the presence of a peroxide polymerization catalyst a mixture consisting of from 45 to 85 per cent by weight of acrylonitrile, from 5 to 30 per cent by weight of N-methylmaleamic acid, and from 5 to 30 per cent by weight of methyl acrylate.

13. A process for preparing a ternary interpolymer comprising polymerizing in the presence of a peroxide polymerization catalyst a mixture consisting of from 45 to 85 per cent by weight of acrylonitrile, from 5 to 30 per cent by weight of N-methylmaleamic acid, and from 5 to 30 per cent by weight of vinyl acetate.

14. A process for preparing a ternary interpolymer comprising polymerizing in the presence of a peroxide polymerization catalyst a mixture consisting of from 45 to 85 per cent by weight of acrylonitrile, from 5 to 30 per cent by weight of maleanilic acid, and from 5 to 30 per cent by weight of methyl acrylate.

JOHN R. CALDWELL.

No references cited.